US011343168B2

United States Patent
Zu et al.

(10) Patent No.: US 11,343,168 B2
(45) Date of Patent: May 24, 2022

(54) INTERCONNECTED REGION CONTROLLER, INTERCONNECTED REGION CONTROL METHOD, AND COMPUTER STORAGE MEDIUM

(71) Applicant: CHINA UNIONPAY CO., LTD., Shanghai (CN)

(72) Inventors: Lijun Zu, Shanghai (CN); Hang Yuan, Shanghai (CN); Yongkai Zhou, Shanghai (CN); Shuo He, Shanghai (CN); Zhijun Wei, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 190 days.

(21) Appl. No.: 16/641,006

(22) PCT Filed: Aug. 27, 2018

(86) PCT No.: PCT/CN2018/102534
§ 371 (c)(1),
(2) Date: Feb. 21, 2020

(87) PCT Pub. No.: WO2019/047740
PCT Pub. Date: Mar. 14, 2019

(65) Prior Publication Data
US 2021/0377149 A1 Dec. 2, 2021

(30) Foreign Application Priority Data
Sep. 6, 2017 (CN) .......................... 201710794656.9

(51) Int. Cl.
*H04L 45/00* (2022.01)
*H04L 12/46* (2006.01)
(Continued)

(52) U.S. Cl.
CPC .......... *H04L 45/04* (2013.01); *H04L 12/4645* (2013.01); *H04L 45/586* (2013.01); *H04L 45/64* (2013.01); *H04L 47/2483* (2013.01)

(58) Field of Classification Search
CPC ....... H04L 45/04; H04L 45/586; H04L 45/64; H04L 12/4645; H04L 47/2483
See application file for complete search history.

(56) References Cited

U.S. PATENT DOCUMENTS 9,338,094 B2  5/2016  Kotha et al.
2007/0058638 A1  3/2007  Guichard et al.
(Continued)

FOREIGN PATENT DOCUMENTS

CN  1878115 A  12/2006
CN  102047245 A  5/2011
(Continued)

OTHER PUBLICATIONS

The European Patent Office (EPO) The Extended European Search Report for 18853142.0 dated Aug. 20, 2020 10 Pages.
(Continued)

*Primary Examiner* — Azizul Choudhury
(74) *Attorney, Agent, or Firm* — Anova Law Group, PLLC

(57) ABSTRACT

The present disclosure provides a region interconnect (RI) controller including a region interconnect routing module configured when a tenant is created. The region interconnect routing module is configured to assign a first identifier to the tenant for identifying traffic of the tenant, in a core switching network, create a virtual routing forwarding instance for the tenant and bind the first identifier and the virtual routing forwarding instance, and to activate a dynamic routing protocol in the core switching network and bind a dynamic routing protocol instance to the virtual routing forwarding
(Continued)

instance, where virtual routers corresponding to the tenant and distributed in a plurality of independent network partitions are associated with the region interconnect control method and a computer storage medium. The technical solution of the present disclosure achieves a direct intranet connection in a heterogeneous SDN network region.

18 Claims, 4 Drawing Sheets

(51) Int. Cl.
*H04L 45/586* (2022.01)
*H04L 45/64* (2022.01)
*H04L 47/2483* (2022.01)

(56) References Cited

U.S. PATENT DOCUMENTS

| | | | | |
|---|---|---|---|---|
| 2012/0311120 | A1* | 12/2012 | Yasuda | H04L 41/145 709/223 |
| 2013/0044641 | A1* | 2/2013 | Koponen | H04L 12/66 370/255 |
| 2013/0287026 | A1* | 10/2013 | Davie | H04L 49/70 370/392 |
| 2014/0010109 | A1* | 1/2014 | Himura | H04L 41/0853 370/254 |
| 2014/0334495 | A1 | 11/2014 | Stubberfield et al. | |
| 2015/0326467 | A1 | 11/2015 | Fullbright et al. | |
| 2016/0134520 | A1 | 5/2016 | Kapadia et al. | |
| 2016/0308762 | A1* | 10/2016 | Teng | H04L 12/4641 |

FOREIGN PATENT DOCUMENTS

| | | |
|---|---|---|
| CN | 103095606 A | 5/2013 |
| CN | 103607432 A | 2/2014 |

OTHER PUBLICATIONS

The World Intellectual Property Organization (WIPO) International Search Report for PCT/CN2018/102534 dated Nov. 16, 2018 6 pages.

* cited by examiner

INTERCONNECTED REGION CONTROLLER, INTERCONNECTED REGION CONTROL METHOD, AND COMPUTER STORAGE MEDIUM

CROSS-REFERENCES TO RELATED APPLICATIONS

This application is a national stage application of International Application No. PCT/CN2018/102534, filed Aug. 27, 2018, which claims priority of Chinese patent application No. 201710794656.9, filed with the State Intellectual Property Office of P. R. China on Sep. 6, 2017, the entire contents of both of which are incorporated herein by reference.

TECHNICAL FIELD

The present disclosure relates to automatic management of a core switching network at a data center and, more particularly, to a region interconnect controller, a region interconnect control method between a plurality of independent network partitions and the core switching network, and a computer storage medium.

BACKGROUND

Due to a specialty of financial industry supervision, a switching network architecture of a financial data center generally is composed of a plurality of independent network partitions (such as fortress areas, business areas, etc.), and the different network partitions carry different security levels and types of services. As shown in FIG. 1, the network partitions are generally divided into three types, a business area, an isolation area, and a specific functional area. The business area is used to carry various system application servers and database servers, and application systems are divided into different business areas based on specific principles. The isolation area is also called demilitarized zone (DMZ), which is used to carry various types of front-end processors and provide services to Internet or third-party organizations. The specific functional area, such as a management area, carries a monitoring system, a process system, an operation terminal, etc., and is used for data center maintenance and a connectivity of a wide area network (WAN) user data center and a backbone network.

Software-defined networking (SDN) technology is increasingly being used in financial clouds. A network partition is usually composed of SDN equipment of a same brand. Virtual extensible LAN (VXLAN) is internally used to separate physical link (Underlay) and logic link (Overlay) networks to achieve decoupling of physical architecture and logical architecture of a network. The Underlay architecture based on the hardware SDN technology (such as ACI of Cisco, AC of Huawei, etc.) usually uses a physical structure of Spine+Leaf. A computing Leaf access provides computing server resources for virtual machines, a network function Leaf access carries network element service equipment resources such as balance, firewall, etc., and a Border Leaf is responsible for interconnectivity of core switching equipment of the data center. In cloud network partitions, Spine equipment is responsible for traffic inter-operation between the Leafs, and each cloud network partition is managed and controlled by its controller.

In practical applications, a core switching network of the data center is networked by independent switching equipment. The different cloud network partitions may use different SDN solutions, protocols, and technologies. A VXLAN tag inside the cloud network partition is stripped after a data packet leaves the partition. Therefore, the inter-operation cannot be realized between the cloud network partitions at an Overlay level.

In the current scheme shown in FIG. 2, no technology exists to realize automatic management for the core networks of the data center, and no scheme exists to coordinate and control the SDN controllers of different manufacturers.

Information disclosed above in the background section of the present disclosure is merely intended to increase understanding of a general background of the present disclosure, which should not be seen as an acknowledgement or any form of suggestion that the information becomes the prior art known to those of ordinary skill in the art.

SUMMARY

To solve at least one of the plurality of problems existing in the prior solutions, in accordance with the present disclosure, there is provided a cross-heterogeneous-SDN-networks region interconnect (RI) controller scheme based on virtual routing forwarding (VRF) table technology. This solution solves problems of interconnectivity and inter-operation of heterogeneous SDN network regions, and by isolating a route of a tenant through the VRF technology, solves the problem of overlapping of communication addresses of the different tenants across heterogeneous SDN network regions inside the same data center, so as to realize an intranet connectivity of the heterogeneous SDN network region.

In accordance with one aspect of the present disclosure, there is provided a RI controller. The RI controller is configured between a plurality of independent network partitions and a core switching network. The RI controller includes a region interconnect routing module (in the context of the present disclosure also called RI router). The RI router is configured to assign a first identifier to the tenant for identifying traffic of the tenant, to create a virtual routing forwarding instance for the tenant in the core switching network and bind the first identifier and the virtual routing forwarding instance, and to activate a dynamic routing protocol in the core switching network and bind a dynamic routing protocol instance and the virtual routing forwarding instance. The virtual routers corresponding to the tenant and distributed at the plurality of independent network partitions are associated with the RI router.

For the traffic of the tenant that needs to flow out of the network partition, a tag carried by the virtual network is stripped, but at the same time, the first identifier (i.e., VLAN tag) assigned by the RI router to the tenant is marked and sent to the core switching network. With this scheme, the problems that, due to different technology systems, the independent SDN networks cannot identify the traffic and the independent networks cannot inter-operate are solved.

Preferably, in the RI controller described above, the virtual router is a logical switch that performs data exchanges of an intranet and an extranet of the network partition.

Preferably, in the RI controller described above, the RI router is configured to activate a dynamic routing protocol at all the routers or switches of the core switching network through a Netconf protocol, so that the tenant can run an independent dynamic routing protocol domain in the core switching network. Through the dynamic routing protocol, the route published by the network partition may be synchronized at the other network partitions, where the virtual resources of the tenant are located.

In an embodiment, the dynamic routing protocol is an open shortest path first (OSPF) routing protocol. Through activating the OSPF routing protocol at all the routers and switches of the core switching network and binding an OSPF instance and the virtual routing forwarding instance of the tenant, this is equivalent to that each tenant runs an independent OSPF domain in the core switching network without interfering each other.

Preferably, in the RI controller described above, by writing a binding relationship of the virtual routers and the RI router, the RI controller establishes an associated relationship between them, that is, the virtual routers distributed at each of the network partitions of the same tenant are carried by the RI router.

Preferably, in the RI controller described above, the RI router is configured to activate a timer to dynamically detect changes of the virtual resources of the associated virtual routers and call an application program programming interface of the SDN controller at the network partition where the virtual routers are located, so as to obtain the associated relationship of the virtual routers and virtual networks.

If the virtual network resources created in the tenant are bound to the virtual router, a static route may be automatically delivered at the router/switch connected to the core switching network of the region, and the address of a next-hop points to the inside of the region. This static route may be redistributed into a dynamic route (such as an OSPF route) and synchronized to the equivalent instances of the other dynamic routing protocols in the virtual route forwarding instance corresponding to the tenant.

Preferably, in the RI controller described above, among the plurality of independent network partitions, the newly created virtual resources of the tenant are bound to the virtual router at the network partition where the virtual resources are located and associated with the RI router.

In accordance with another aspect of the present disclosure, there is provided a RI control method between a plurality of independent network partitions and a core switching network. The method includes configuring a RI router when creating a tenant. The RI router is configured to assign a first identifier to the tenant for identifying traffic of the tenant, to create a virtual routing forwarding instance for the tenant in the core switching network and bind the first identifier and the virtual routing forwarding instance, to activate a dynamic routing protocol in the core switching network and bind a dynamic routing protocol instance and the virtual routing forwarding instance, and to associate virtual routers corresponding to the tenant and distributed at the plurality of network partitions with the RI router.

In accordance with another aspect of the present disclosure, there is provided a computer storage medium including one or more instructions. The one or more instructions are executed by a computer to execute the following processes. A RI router is configured when a tenant is created. The RI router is configured to assign a first identifier to the tenant for identifying traffic of the tenant, to create a virtual routing forwarding instance for the tenant in a core switching network and bind the first identifier and the virtual routing forwarding instance, to activate a dynamic routing protocol in the core switching network and bind a dynamic routing protocol instance and the virtual routing forwarding instance, and to associate virtual routers corresponding to the tenant and distributed at the plurality of network partitions with the RI router.

The RI control scheme provided by the present disclosure solves the problems that the independent SDN networks cannot identify the traffic, cannot communicate with each other, and cannot uniformly be managed at a logical level due to the different technology systems. In addition, the RI controller scheme of the present disclosure realizes the abstracting, separating, scheduling, and uniformly managing the Underlay physical network resources. The RI controller scheme of the present disclosure exposes a standardized API to Overlay services and shields Underlay differences so that better scheduling can be performed with an Overlay platform.

With accompanying drawings and specific embodiments used to describe certain principles of the present disclosure with the drawings, other features, and advantages of the method and apparatus of the present disclosure may become clear or be clarified.

DETAILED DESCRIPTION OF THE EMBODIMENTS

The specification below describes specific embodiments of the present disclosure and teaches those of skill in the art how to manufacture and implement embodiments of the present disclosure. To teach principles of the disclosure, some general aspects have been simplified or omitted. Those of skill in the art should understand that the modifications from those embodiments will fall within the scope of the present disclosure. Those of skill in the art should understand that the following described features may be combined in various ways to form the plurality of modifications of the present disclosure. Therefore, the present disclosure is not limited by the following specific embodiments, but only defined by claims and their equivalents.

In the context of the present disclosure, terms of "region interconnect controller" or "RI controller" have the same meaning, which represents a controller configured between heterogeneous SDN network partitions and a core switching network. In addition, in the context of the present disclosure, unless otherwise specified, "RI router" and "region interconnect routing module" may have the same meaning too.

Figure 1:
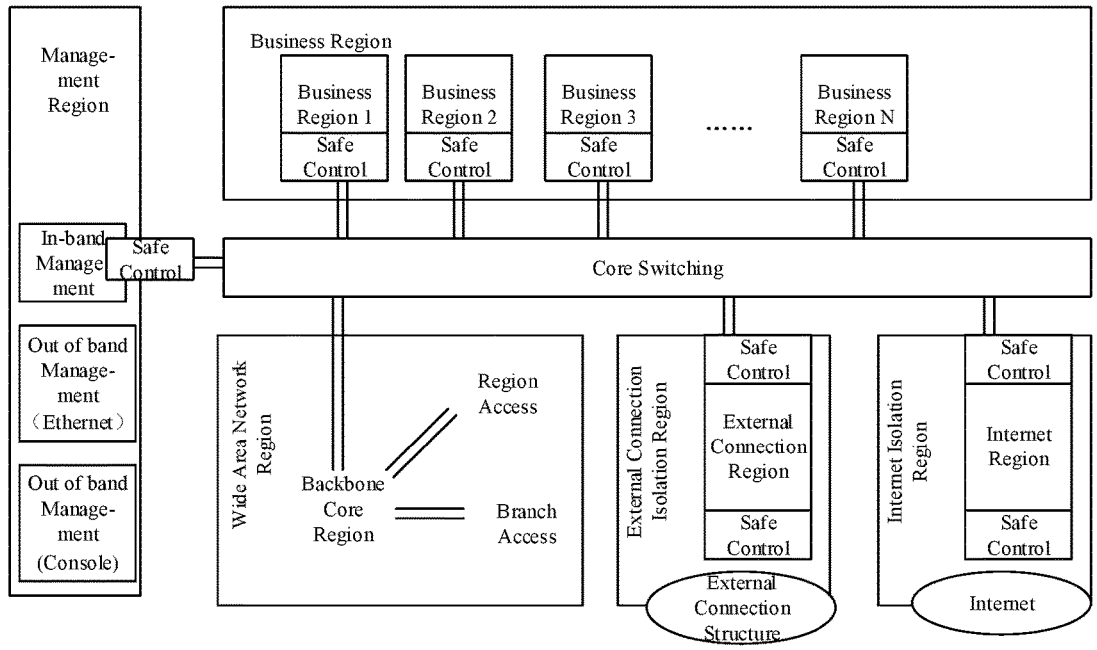
FIG. 1 is a schematic diagram of the network partitions of the financial industry.
Figure 2:
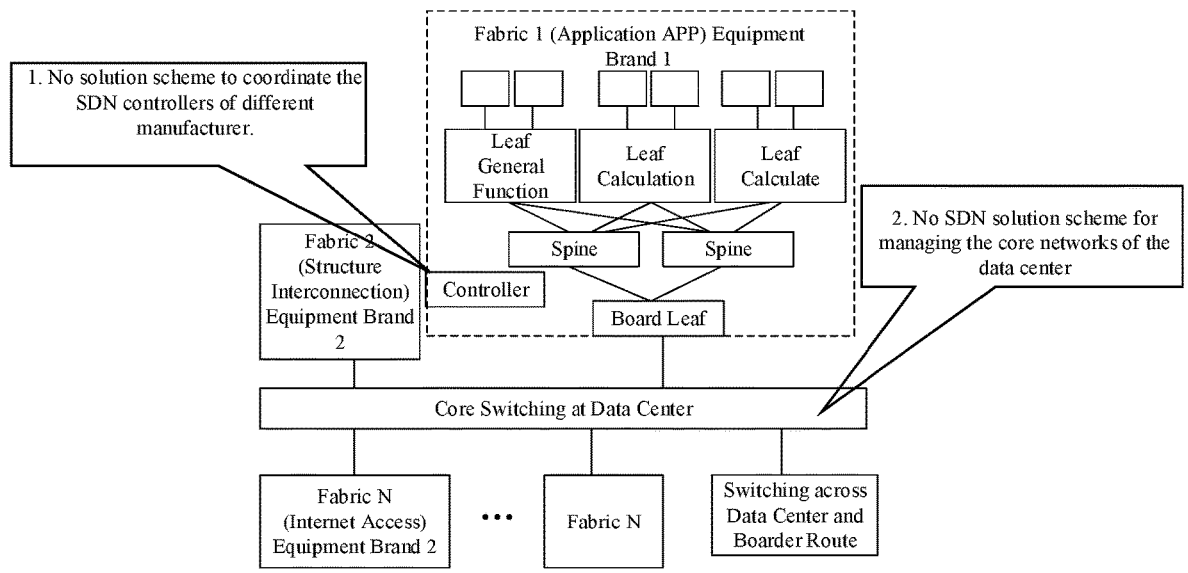
FIG. 2 illustrates a current networking method.
Figure 3:
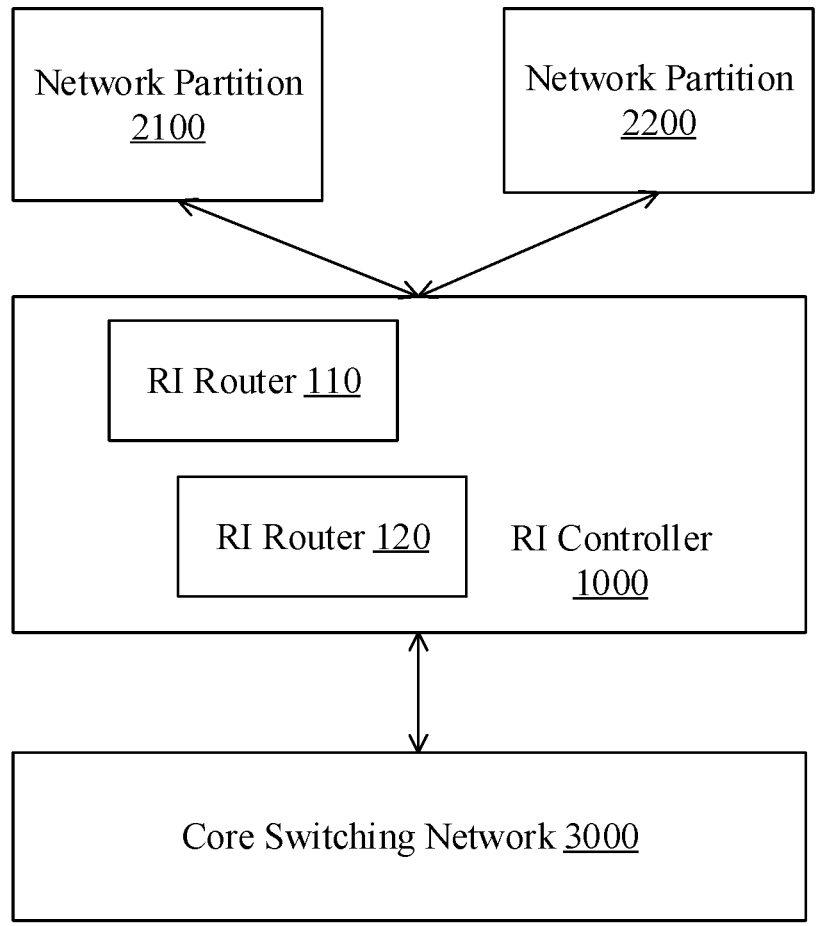
FIG. 3 is a region interconnect (RI) controller according to an embodiment of the present disclosure.

FIG. 3 is a RI controller 1000 according to an embodiment of the present disclosure. The RI controller 1000 is configured between a plurality of independent network partitions 2100 and 2200 and a core switching network 3000. The RI controller 1000 includes a plurality of RI routers 110 and 120, where the RI routers are configured when corresponding tenants are created.

In an embodiment, the RI router is configured to assign a first identifier (not shown) to the corresponding tenant for identifying traffic of the tenant, to create a first virtual routing forwarding instance for the tenant at the core switching network 3000 and bind the first identifier and the first virtual routing forwarding instance, to activate a dynamic routing protocol (such as OSPF protocol) in the core switching network 3000 and bind a dynamic routing protocol instance and the first virtual routing forwarding instance. Virtual routers corresponding to the tenant and distributed at the plurality of independent network partitions 2100 and 2000 are associated with the RI router 110.

In another embodiment, RI router 120 is configured to assign a second identifier (not shown) to the corresponding tenant for identifying traffic of the tenant, to create a second virtual routing forwarding instance for the tenant at the core switching network 3000 and bind the second identifier and the second virtual routing forwarding instance, to activate the dynamic routing protocol (such as OSPF protocol) at the core switching network 3000 and bind the dynamic routing protocol instance and the second virtual routing forwarding instance. The virtual routers corresponding to the tenant and distributed at the plurality of independent network partitions 2100 and 2000 are associated with the RI router 120.

Figure 4:
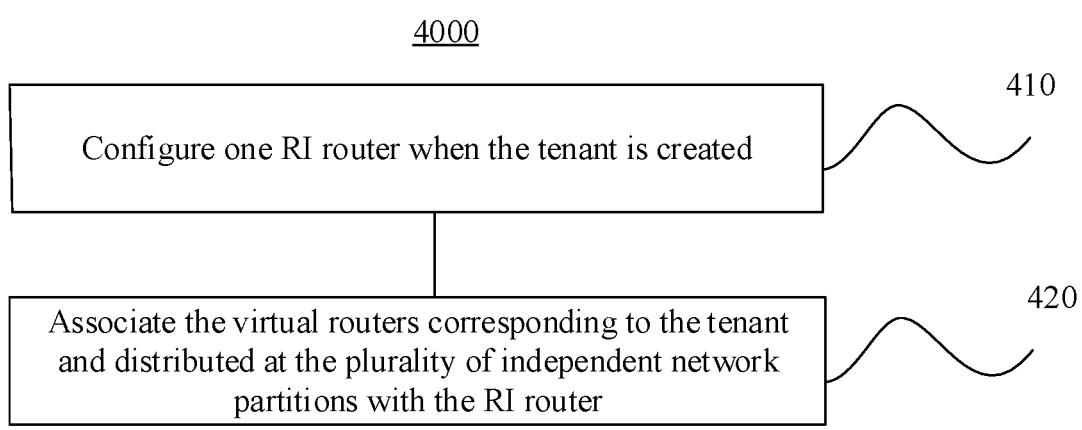
FIG. 4 is a region interconnect (RI) control method according to an embodiment of the present disclosure.

FIG. 4 is an RI control method 4000 according to an embodiment of the present disclosure.

As shown in FIG. 4, at 410, one RI router is configured when the tenant is created. The RI router is configured to assign the first identifier to the tenant for identifying the traffic of the tenant, to create the virtual routing forwarding instance for the tenant at the core switching network and bind the first identifier and the virtual routing forwarding instance, to activate the dynamic routing protocol at the core switching network and bind the dynamic routing protocol and the virtual routing forwarding instance.

At 420, the virtual routers corresponding to the tenant and distributed at the plurality of independent network partitions are associated with the RI router.

Through the RI control scheme shown in FIG. 3 and FIG. 4, the problem that the independent networks cannot interoperate with each other in the existing technology may be solved.

Figure 5:
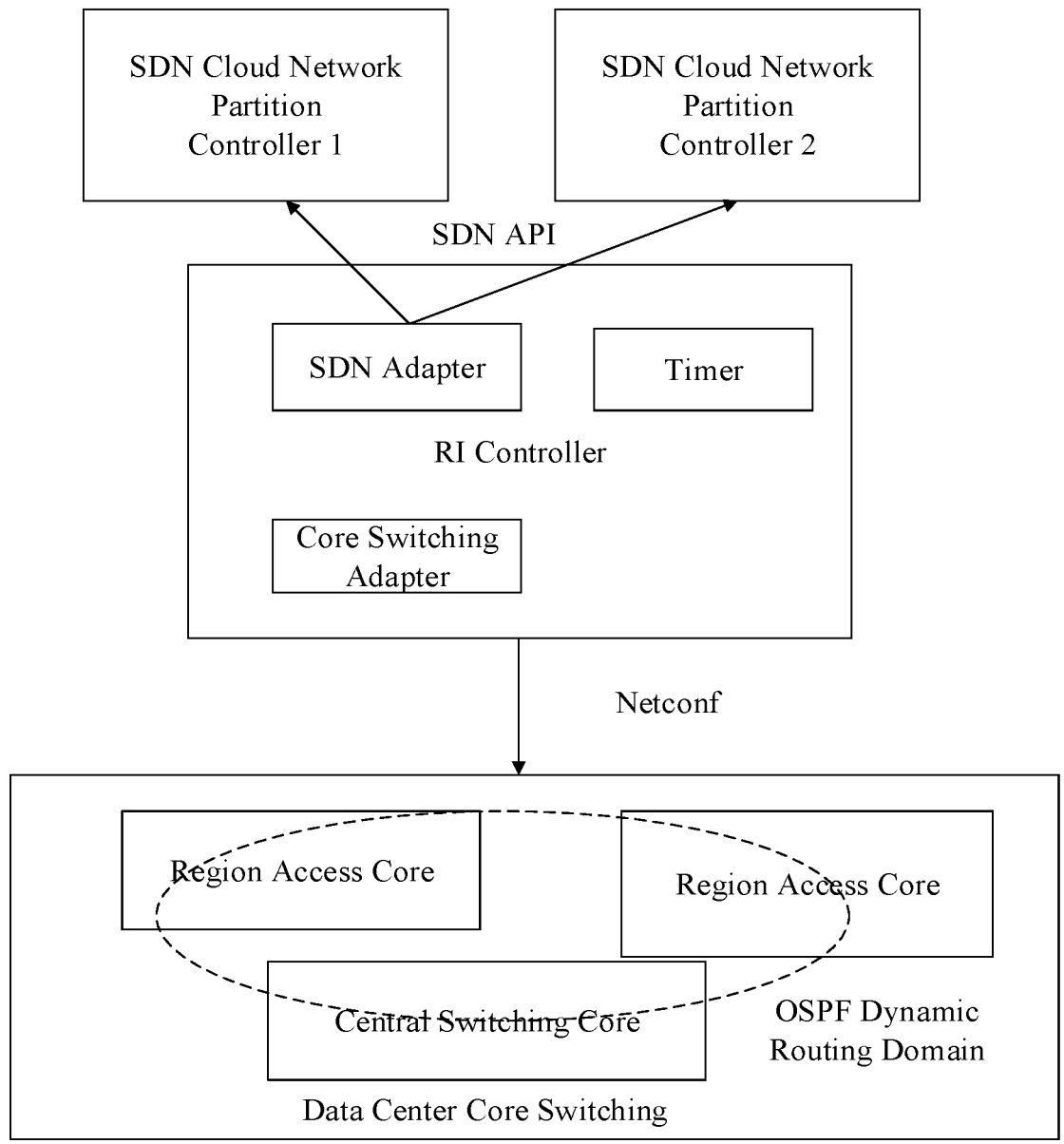
FIG. 5 is a diagram of an architecture of a region interconnect (RI) controller according to an embodiment of the present disclosure.

With further reference to FIG. 5, which is the diagram of the architecture of the RI controller according to an embodiment of the present disclosure. In the embodiment, the network with the dynamic routing protocol is built at the core switching network through the RI controller, the virtual network resources at different SDN network regions are synchronized to the other SDN network regions to allow the business traffic route to be reachable at the network partitions. The RI controller integrates the virtual network resources of the different network partitions and delivers configuration information to the core switching network through the Netconf standard protocol to achieve interconnectivity between different network partitions of the same data center.

At the logic level, as shown in FIG. 5, the RI controller can be divided into a control logic unit and a configuration deliver logic unit. The control logic unit monitors changes of the virtual resources at the different SDN network regions of the tenant. The configuration delivers logic unit updates the configuration information and route tables. The RI controller abstracts the routing/switching equipment of different manufacturers and provides different drivers for the equipment of the different manufacturers, that is, can uniformly manage the equipment.

For a scenario of the plurality of tenants, the resources of the different tenants are independent, and IP addresses may overlap. Since the tenant information is stripped after the business traffic flows out of the network partition, the traffic from the different tenants cannot be identified. The RI controller can identify the virtual resources of the tenants and build the tenant information for the traffic outside of the network partitions so that the traffic can be correctly forwarded at the core switching network. The RI controller implements route isolations of the tenants through virtual routing and forwarding table (VRF) technology and virtualizes the RI router resources for each corresponding tenant at the same time. Mapping is performed to the VRF and the RI router. The RI router assigns a tag for each tenant to identify the traffic information of the different tenants and sends the tag to the corresponding VRF to complete forwarding.

In an embodiment, the RI controller executes the following operation processes.

1. RI Router Logic Creation and VLAN TAG Identification and Assignment

The RI router is configured when the tenant is created. The RI router assigns a VLAN TAG to the tenant for identifying the traffic of the tenant, and the created RI router is written into the database. For the traffic of the tenant that needs to flow out of the network partition, the VLAN TAG carried by the virtual network may be stripped, and at the same time, the VLAN TAG assigned by the RI router for the tenant is marked and sent to the core switching network.

2. Core Switching Network Configuration Delivery (VRF Creation)

The RI router creates the VRF resources for the tenant at all the routers/switches of the core switching network through Netconf protocol and at the same time binds the VLAN TAG assigned by the RI router to the tenant for use and the VRF so that the tenant can create an independent routing forwarding domain in the core switching network.

3. Core Switching Network Configuration Delivery (Dynamic Routing Protocol Configuration)

The RI router activates the dynamic routing protocol at all the routers/switches of the core switching network through the Netconf protocol and binds the dynamic routing protocol instance and the VRF of the tenant, which is equivalent to that each tenant runs the independent dynamic routing protocol at the core switching network without interfering with each other. Through the dynamic routing protocol, the route published by the network partition may be synchronized to the other network partitions, where the virtual resources of the tenant are located.

4. Tenant Virtual Router of Each Cloud Network Partition Creation

Figure 6:
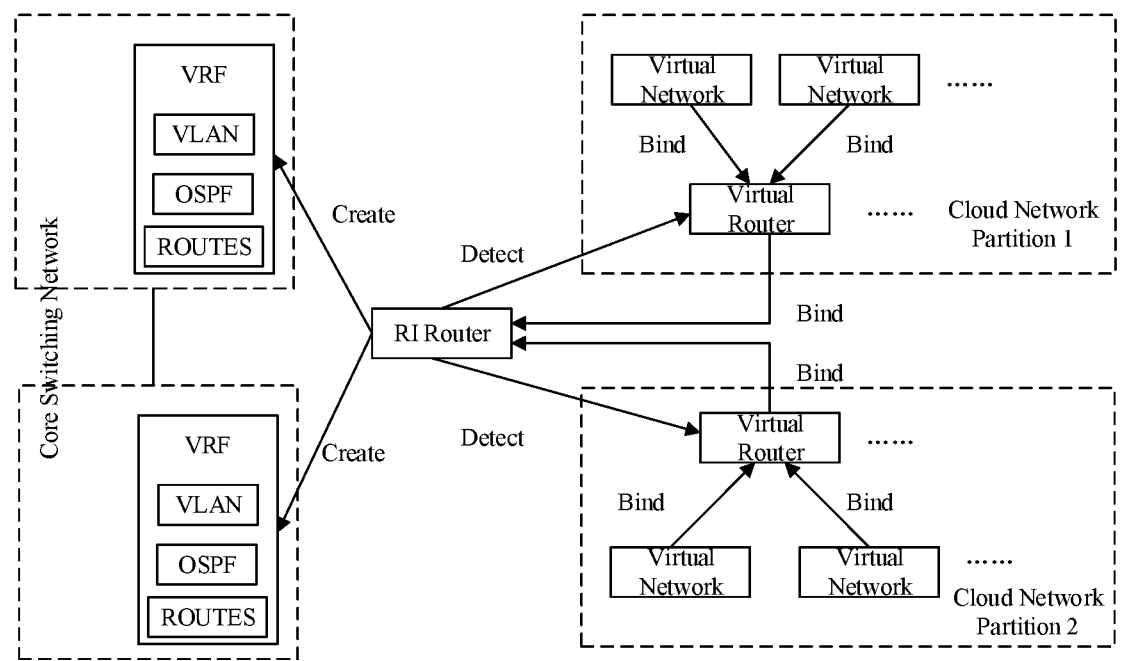
FIG. 6 is a diagram of an architecture of a region interconnect (RI) routing module at a logic level according to an embodiment of the present disclosure.

The virtual routers are the logic switches of data exchanges of the intranet and the extranet of the cloud network partitions. As shown in FIG. 6, the scheme builds a mapping relationship through mounting the virtual router of the same tenant in each cloud network partition to the RI router and writing a binding relationship between the virtual router and the RI router into the database.

5. Elastic Change of Tenant Virtual Network Resources of Each Cloud Network Partition With further reference to FIG. 6, in each cloud network partition, the tenant can dynamically create the virtual network resources and the virtual router resources. For the business required for the communications across the cloud network partitions, the virtual network just needs to be bound to the virtual router, which establishes a mapping relationship with the RI router.

6. RI Router Dynamical Detection of Changes and Synchronization of Virtual Network Resources After the RI router is associated with the virtual routers, the RI router will activate the timer to dynamically detect the changes of the virtual network resources of the associated virtual routers and call the API of the SDN controller in the cloud network partition, where the virtual routers are located, to obtain the associated relationship of the virtual routers and the virtual network. If the virtual network resources created by the tenant are bound to the virtual router, a static route may be automatically delivered by the router/switch connected to the core switching network in the region. The static route may be redistributed to the dynamic route and synchronized to the other dynamic routing protocol peer at the VRF corresponding to the tenant.

In summary, a region interconnect (RI) control scheme based on the virtual routing and forwarding table (VRF) technology across heterogeneous SDN networks is provided. In a specific implementation, the scheme includes four processes of the creation of the virtual routers, the binding of the virtual routers of the tenant and the RI router, the automatic delivery of the route of the RI router, and automatic configuration of the core switching network. In the context of the present disclosure, unless otherwise specified, the term "dynamic routing protocol" may include protocols such as OSPF, BGP, etc.

Compared to the current technology, this control scheme solves the problems that the independent SDN networks cannot identify the traffic, cannot inter-operate with each other, and cannot be uniformly managed at the logic level due to the different technology systems. In addition, the RI controller scheme of the present disclosure realizes the abstraction, the isolation, the scheduling, and the uniform management of the Underlay physical network resources. In addition, the RI controller of the present disclosure exposes the standardized API to the Overlay services and shields the Underlay differences, so as to perform better scheduling with the Overlay platform.

The examples above mainly describe one or more embodiments of the present disclosure. Though only some specific embodiments of the present disclosure are described in detail, those of skill in the art should understand that the present disclosure can be embodied with a plurality of other forms without departing from its purpose and scope. Therefore, the demonstrated examples and embodiments are seen as illustrative but not restrictive. Without departing from the spirit and scope of the present disclosure defined by such as the appended claims, various modifications and replacements may be covered by the present disclosure.

What is claimed is:

1. A region interconnect (RI) controller configured between a plurality of independent network partitions implemented by different software-defined networking (SDN) providers and a core switching network, comprising:
a RI router configured to:
update a configuration of the RI router in response to a request of creating a tenant having network resources distributed at the plurality of network partitions, comprising:
assigning a first identifier to the tenant for identifying traffic of the tenant;
creating a virtual routing forwarding instance for the tenant and binding the first identifier and the virtual routing forwarding instance at the core switching network; and
activating a dynamic routing protocol for the tenant at all routers and/or switches of the core switching network and binding a dynamic routing protocol instance to the virtual route forwarding instance, such that an independent dynamic routing protocol domain of the tenant is run at the core switching network, wherein respective virtual routers corresponding to the tenant and distributed at the plurality of network partitions are associated with the RI router;
receive a route corresponding to the tenant newly published at a first network partition from a virtual router corresponding to the tenant at the first network partition; and
synchronize, through the independent dynamic routing protocol domain of the tenant at the core switching network, the route corresponding to the tenant at the first network partition with the respective virtual routers corresponding to the tenant and distributed at network partitions of the plurality of network partitions other than the first network partition.

2. The RI controller of claim 1, wherein each virtual router is a logic switch, which performs data exchange of an intranet and an extranet of the corresponding network partition.

3. The RI controller of claim 1, wherein the RI router is configured to activate the dynamic routing protocol at all routers or switches of the core switching network through a Netconf protocol.

4. The RI controller of claim 1, wherein the RI controller, through writing a binding relationship of the virtual routers and the RI router into a database, establishes an associated relationship between the virtual routers and the RI router.

5. The RI controller of claim 1, wherein the RI router is further configured to:
activate a timer to dynamically detect changes of the virtual network resources of the associated virtual router; and
call an application program programming interface of a software-defined networking (SDN) controller at the network partition where the virtual router is located, so as to obtain an associated relationship of the virtual router and a virtual network.

6. The region interconnect (RI) controller of claim 1, wherein in the plurality of network partitions, virtual resources created by the tenant are bound to the virtual router at the network partition where the virtual resources are located and associated with the RI router.

7. A region interconnect (RI) control method between a plurality of independent network partitions implemented by different software-defined networking (SDN) providers and a core switching network, comprising:
configuring a RI router in response to a request of creating a tenant having network resources distributed at the plurality of network partitions, comprising:
assigning a first identifier to the tenant for identifying traffic of the tenant;
creating a virtual routing forwarding instance for the tenant and binding the first identifier and the virtual routing forwarding instance at the core switching network; and
activating a dynamic routing protocol for the tenant at all routers and/or switches of the core switching network and binding a dynamic routing protocol instance to the virtual route forwarding instance, such that an independent dynamic routing protocol domain of the tenant is run at the core switching network, wherein respective virtual routers corresponding to the tenant and distributed at the plurality of network partitions are associated with the RI router;

receiving a route corresponding to the tenant newly published at a first network partition from a virtual router corresponding to the tenant at the first network partition; and synchronizing, through the independent dynamic routing protocol domain of the tenant at the core switching network, the route corresponding to the tenant at the first network partition with the respective virtual routers corresponding to the tenant and distributed at network partitions of the plurality of network partitions other than the first network partition.

8. The RI control method of claim 7, wherein the RI router is a logic switch configured to perform data exchanges of an intranet and an extranet of the corresponding network partition.

9. The RI control method of claim 7, wherein the dynamic routing protocol is activated at all the routers or switches at the core switching network through a Netconf protocol.

10. The RI control method of claim 7, further comprising:
establishing, by the RI router, through writing a binding relationship of the virtual routers and the RI router into a database, an associated relationship between the virtual routers and the RI router.

11. The RI control method of claim 7, further comprising:
activating, by the RI router, a timer to dynamically detect changes of virtual network resources of the corresponding virtual routers; and calling an application program programming interface of a software-defined networking (SDN) controller of the network partition where the virtual routers are located, so as to obtain an associated relationship of the virtual routers and the virtual network.

12. The RI control method of claim 7, wherein in the plurality of independent network partitions, virtual resources created by the tenant are bound to the virtual router at the network partition where the virtual resources are located and associated with the RI router.

13. A computer storage medium having stored therein one or more instructions that, when executed by a processor of a region interconnect (RI) controller configured between a plurality of independent network partitions implemented by different software-defined networking (SDN) providers and a core switching network, causes the processor to perform:
configuring a RI router in response to a request of creating a tenant having network resources distributed at the plurality of network partitions, comprising:
assigning a first identifier to the tenant for identifying traffic of the tenant;
creating a virtual routing forwarding instance for the tenant and binding the first identifier and the virtual routing forwarding instance at the core switching network; and activating a dynamic routing protocol for the tenant at all routers and/or switches of the core switching network and binding a dynamic routing protocol instance to the virtual route forwarding instance, such that an independent dynamic routing protocol domain of the tenant is run at the core switching network, wherein respective virtual routers corresponding to the tenant and distributed at the plurality of network partitions are associated with the RI router;

receiving a route corresponding to the tenant newly published at a first network partition from a virtual router corresponding to the tenant at the first network partition; and synchronizing, through the independent dynamic routing protocol domain of the tenant at the core switching network, the route corresponding to the tenant at the first network partition with the respective virtual routers corresponding to the tenant and distributed at network partitions of the plurality of network partitions other than the first network partition.

14. The computer storage medium of claim 13, wherein the RI router is a logic switch configured to perform data exchanges of an intranet and an extranet of the corresponding network partition.

15. The computer storage medium of claim 13, wherein the dynamic routing protocol is activated at all the routers or switches at the core switching network through a Netconf protocol.

16. The computer storage medium of claim 13, wherein the RI router, through writing a binding relationship of the virtual routers and the RI router into a database, establishes an associated relationship between the virtual routers and the RI router.

17. The computer storage medium of claim 13, wherein the one or more instructions further causes the processor to perform:
activating a timer to dynamically detect changes of virtual network resources of the corresponding virtual routers; and calling an application program programming interface of a software-defined networking (SDN) controller of the network partition where the virtual routers are located, so as to obtain an associated relationship of the virtual routers and the virtual network.

18. The computer storage medium of claim 13, wherein in the plurality of independent network partitions, virtual resources created by the tenant are bound to the virtual router at the network partition where the virtual resources are located and associated with the RI router.

* * * * *